United States Patent
Hirayama et al.

(10) Patent No.: US 6,807,276 B2
(45) Date of Patent: Oct. 19, 2004

(54) PORTABLE TELEPHONE

(75) Inventors: Naofumi Hirayama, Tokyo (JP);
Mizuki Tomono, Tokyo (JP); Yoshinori Nakatsuka, Tokyo (JP); Mikiko Arakawa, Iruma (JP); Katsumi Kobayashi, Kawaguchi (JP)

(73) Assignees: Pioneer Corporation, Tokyo (JP); Pioneer Design Corporation, Tokyo (JP)

( * ) Notice: Subject to any disclaimer, the term of this patent is extended or adjusted under 35 U.S.C. 154(b) by 395 days.

(21) Appl. No.: 09/871,702

(22) Filed: Jun. 4, 2001

(65) Prior Publication Data

US 2002/0018558 A1 Feb. 14, 2002

(30) Foreign Application Priority Data

Jun. 6, 2000 (JP) ........................................ 2000-169132
Jun. 13, 2000 (JP) ........................................ 2000-176617

(51) Int. Cl.⁷ .............................................. H04M 1/00
(52) U.S. Cl. ............................. 379/433.07; 379/433.13
(58) Field of Search ...................... 379/433.04, 433.07, 379/433.12, 433.13, 368; 455/575.3, 575.4, 90.5

(56) References Cited

U.S. PATENT DOCUMENTS 5,327,584 A * 7/1994 Adachi et al. ......... 379/433.13
6,009,338 A * 12/1999 Iwata et al. ............ 379/433.12
6,038,313 A    3/2000 Collins

FOREIGN PATENT DOCUMENTS

| EP | 0 691 603 A1 | 1/1996 |
| EP | 0 933 908 A2 | 9/1999 |
| GB | 2 330 032 A  | 4/1999 |

* cited by examiner

Primary Examiner—Jack Chiang
(74) Attorney, Agent, or Firm—Morgan, Lewis & Bockius LLP

(57) ABSTRACT

A portable telephone, equipped with an opening/closing cover, which houses an operating part. An operating panel is mounted to a main casing in a manner enabling movement between a position at the front face side and a position at the inner side of the main casing, and a compression spring, which urges this operating panel in the direction of the position at the front face side of the main casing is equipped. When the opening/closing cover is at the closed position, the operating panel is positioned at the position at the inner side of the main casing, and when the opening/closing cover is opened, the operating panel is moved to the position at the front face side by the compression spring so that it is positioned at a position at which the operating surface is substantially flush with the back face of the opening/closing cover that is positioned at the opened position. With another aspect of this invention, an opened/closed condition detection sensor is provided, and in response to the opening and closing of the opening/closing cover, an image is displayed on the display panel in accordance with a signal processed image signal.

7 Claims, 10 Drawing Sheets

PORTABLE TELEPHONE

BACKGROUND OF THE INVENTION

1. Field of the Invention

This invention relates to a portable telephone equipped with an opening/closing cover that houses an operating part.

2. Description of Related Art

Among prior-art portable telephones, there are those with which an operating part, provided with telephone number input keys, etc., has an opening/closing cover mounted thereto, and this opening/closing cover houses the operating part at its inner side.

FIG. 1 shows a prior-art portable telephone equipped with such a cover for the operating part.

In FIG. 1, an operating part 3, provided with telephone number input keys and various function buttons, is disposed at the lower-half portion of the front face of a main casing 2 of a portable telephone 1.

This operating part 3 is disposed in a recessed part 3A formed in the main casing 2 so that when an opening/closing cover 4 is folded and closed, the front face of this opening/closing cover 4 will be flush with the front face of the main casing 2.

The opening/closing cover 4 has its base end part pivotally supported on the lower end part of the main casing 2 and is thereby mounted to the main casing 2 in a manner enabling opening and closing.

In FIG. 1, 5 denotes a display panel, 6 denotes an antenna, 7 denotes a speaker, and 8 denotes a switch or other form of operating lever.

In the standby condition of this portable telephone 1, the opening/closing cover 4 is folded with respect to the main casing 2 and fitted inside the recessed part 3A of the main casing 2 so that the operating part 3, which is disposed in this recessed part 3A, is housed at the inner side and unexposed to the exterior.

When the operation of the operating part 3 for making or receiving a call, etc. becomes necessary, the opening/closing cover 4 is raised from the main casing 2 and opened so that the operating part 3 will be exposed to the exterior.

Such a portable telephone 1, equipped with the opening/closing cover 4 that houses the operating part 3, has the advantage that, by disposing a microphone and a part of the function buttons at the opening/closing cover 4 side, the outer dimensions of the condition in which the opening/closing cover 4 is folded can be made more compact in comparison to a portable phone that is not equipped with an opening/closing cover, and since in the standby condition, the operating part 3 is housed at the inner side of the folded opening/closing cover 4 and is not exposed to the exterior, the input keys, etc. are protected and erroneous operation due to erroneous pressing of the operating part 3 is prevented.

However, with such a prior art portable telephone 1, since the operating part 3 is disposed within the recessed part 3A for housing the opening/closing cover 4 in the main casing 2, when the opening/closing cover 4 is opened, the operating part 3 is positioned at a position that is recessed from the front face of the main casing 2 and is made difficult to operate.

Particularly, if a part of the function buttons is disposed at the inner surface part of the opening/closing cover 4, the operability becomes poor due to the difference in the stroke of the fingers required for operation, since an offset is formed between the operating part 3 disposed on the main casing 2 and the operating part disposed on the opening/closing cover 4.

Moreover, with the above-described prior-art portable telephone 1, when the opening/closing cover 4 is opened, this opening/closing cover 4 extends to the outer side, making the outer shape large as can be understood from FIG. 1.

Also, with the progresses made in the multi-function capabilities of portable telephones and the increased amount of information sent and received, especially in recent years, the need to make the display panel larger and improve the operability and convenience of portable telephones has been becoming stronger.

Since the outer shape of a portable telephone thus tends to be large, when as in the conventional portable telephone, the opening/closing cover extends to the outer side of the main casing when the opening/closing cover is opened, the outer shape of the portable phone during use becomes even larger, making the phone unfit for portable use.

OBJECTS AND SUMMARY OF THE INVENTION

This invention has been made to resolve the above-described problems of portable telephones and other portable information terminals.

This invention has also been made to solve the above-described problems of prior-art portable telephones with an opening/closing cover that houses the operating part.

An object of this invention is to secure good operability in a portable telephone equipped with an opening/closing cover that houses the operating part.

In order to achieve the above object, a portable telephone according to a first aspect of the present invention, equipped with an opening/closing cover, which can be opened and closed and houses an operating part at the inner side, has an operating panel, which comprises the above mentioned operating part, and which is mounted to a main casing of the portable telephone in a manner enabling movement between a position at the front face side and a position at the inner side of the main casing, a moving part, which moves this operating panel between the position at the front face side and the position at the inner side of the main casing. The above mentioned operating panel is positioned at the position at the inner side of the main casing and is housed at the inner side of the opening/closing cover when the above mentioned opening/closing cover is at the closed position, and the operating panel is moved to the position at the front face side of the main casing by the moving part in accordance with the opening operation of the opening/closing cover when the opening/closing cover is opened so that the operating surface of the operating panel will be positioned at a position at which it will be substantially flush with the back face of the opening/closing cover that is positioned at the opened position.

With this portable telephone according to the first aspect of the invention, when the opening/closing cover is closed as in the standby condition of the portable telephone, the operating panel is positioned at the position at the inner side of the main casing and is housed at the inner side of the opening/closing cover.

Besides, when the opening/closing cover is opened for a sending/receiving operation, etc., the moving part is actuated by the opening operation of the opening/closing cover and the operating panel is moved from the position at the inner side to the position at the front face side of the main casing, and when the opening/closing cover is opened completely and is positioned at the opened position, the operating surface of the operating panel that has been moved by the moving part becomes substantially flush with the back face (the surface that becomes the front face when the opening/closing cover is at the opened position) of the opening/closing cover that is positioned at the opened position.

Thus with the first aspect of this invention, when the opening/closing cover of a portable telephone equipped with the opening/closing cover is opened, an offset does not form between the back face of the opening/closing cover at the opened position and the operating surface of the operating panel. Therefore even when a part of the operation part is disposed on the back face of the opening/closing cover, the operating part disposed at this opening/closing cover and the operating part of the operating panel can be operated by the same stroke of the fingers and good operability can thus be secured.

To achieve the above-described object, a portable telephone according to a second aspect of the invention has, in addition to the arrangement according to the first aspect of this invention, a characteristic that a part of the above mentioned operating part is disposed at the back face side of the above mentioned opening/closing cover. The outer shape of the portable telephone can thereby be made compact and good operability is secured by the operating part disposed on the opening/closing cover and the operating part of the operating panel being positioned substantially within the same plane.

To achieve the above object, a portable telephone according to a third aspect of the invention has, in addition to the arrangement according to the first aspect of this invention, the characteristic that the above mentioned moving part is a resilient member that is interposed between the operating panel and the main casing and urges the operating panel in the direction of the position at the front face side of the main casing, and when the opening/closing cover is opened, the operating panel is moved from the position at the inner side towards the position at the front face side of the main casing by being urged by the resilient member.

To achieve the above object, a portable telephone according to a fourth aspect of the invention has, in addition to the arrangement according to the first aspect of this invention, the characteristic that the above mentioned moving part is an arm member, which is provided on the opening/closing cover and, in accompaniment with the opening operation of the opening/closing cover, engages with the above mentioned operating panel to urge the operating panel in the direction of the position at the front face side of the main casing, and when the opening/closing cover is opened, the operating panel is moved from the position at the inner side towards the position at the front face side of the main casing by being urged by the arm member.

To achieve the above object, a portable telephone according to a fifth aspect of the invention has, in addition to the arrangement according to the first aspect of this invention, the characteristic of being equipped with a movable member, which is mounted to the operating panel in a manner enabling movement relative to the operating panel and, by the urging force that accompanies the opening operation of the opening/closing cover, is moved in the direction of engaging with the main casing and becomes latched to the main casing to position the operating panel at the position at the front face side of the main casing.

With the portable telephone according to the fifth aspect, when the opening/closing cover is opened, the urging force that is generated in accompaniment with this opening operation of the opening/closing cover is applied to the movable member and the movable member is moved in the direction of engaging with the main casing.

Besides when the opening/closing cover is positioned at the opened position, the movable member becomes latched to the main casing and the operating panel is thereby positioned at the position at the front face side of the main casing at which it becomes substantially flush with the back face of the opening/closing cover that is at the opened position.

To achieve the above object, a portable telephone according to a sixth aspect of the invention has, in addition to the arrangement according to the fifth aspect of this invention, the characteristic that a disengaging member, which, when the urging force on said movable member is relieved, urges the engaged movable member in the direction of disengaging from the main casing, is provided at the part of the main casing with which the above mentioned movable member engages. Thus when the urging force on the movable member is relieved in the process of closing the opening/closing cover, the disengaging member urges the movable member in the direction opposite that when the opening/closing cover is opened and disengages the movable member from the main casing, thereby enabling the movement of the operating panel from the position at the front face side towards the position at the inner side of the main casing.

To achieve the above object, a portable telephone according to a seventh aspect of the invention has, in addition to the arrangement according to the first aspect of this invention, the characteristic that the above mentioned main casing is equipped with an opened/closed condition detection part, which detects that the opening/closing cover is opened and thereupon sets the above mentioned operating part in the condition that enables operation. Since the operation of the operating part is thereby enabled when the opening/closing cover is opened and the operation of the operating part is disabled when the opening/closing cover is closed, erroneous operation is prevented and saving of power is achieved.

To achieve the above object, a portable telephone according to an eighth aspect of the invention has, in addition to the arrangement according to the first aspect of this invention, the characteristic that the above mentioned opening/closing cover is mounted to the main casing at a position such that the opening direction will be at the display panel side of the portable telephone. The enlargement of the outer shape of the portable telephone when the opening/closing cover is opened can thereby be prevented.

Another object of this invention is to provide in a portable information terminal equipped with an opening/closing cover, a portable information terminal with which the outer shape will not become large even when the opening/closing cover is opened and yet with which good operability and convenience are secured.

To achieve the above object, a portable information terminal according to a nineth aspect of the invention, equipped with an opening/closing cover, which can be opened and closed and houses an operating part at the inner side, and a display part, which displays images, is equipped with an opened/closed condition detection part, which detects the opening/closing of the above mentioned opening/closing cover, and an image display part, which outputs image signals to the above mentioned display part to make images be displayed on the display part, and which, upon receiving the input of an opened/closed condition detection signal from the above mentioned opened/closed condition detection part, performs, in accordance with the input of the opened/closed condition detection signal, predetermined forms of signal processing on the image signals to be output to the display part and makes images be displayed on the display part in accordance with the signal processed image signals.

The portable information terminal according to the ninth aspect of the invention is equipped with a display part, on which is displayed telephone numbers, electronic mail, and other images, and an opening/closing cover, which can be opened and closed and houses and protects an operating part, for inputting telephone numbers and performing other forms of information processing, at the inner side when the operating part is not used. Besides when the input of a telephone number or other form of information processing is to be performed by operation of the operating part, the opening/closing cover is opened so that the operating part will be exposed to the exterior.

That the opening/closing cover has been opened is detected by the opened/closed condition detection part, and when the opened/closed condition detection signal is input into the image display part from the opened/closed condition detection part, the image display part performs the required signal processes on the image signals to be output to the display part to make the display part display images and changes the images displayed on the display part to the required forms.

For example, in the case where a part of the display part becomes hidden by the opened opening/closing cover and becomes unable to be seen, the image displayed on the display part is compressed and changed to a form with which the entirety of the image can be seen, or an image displayed on the display part is changed to a form with which the image can be scrolled in the required direction so that the necessary parts of the image will not be hidden by the opening/closing cover, or the image displayed on the display part is changed to a form with which a required part of the image is moved to a required position of the display part so that it will not be hidden by the opening/closing cover.

Thus with the above-described ninth aspect of the invention, even in the case where a part of an image displayed on the display part becomes hidden by the opening/closing cover when the opening/closing cover that is mounted to the operating part is opened, the image that is displayed on the display part is changed by the image display part to a required form that will not hinder operations that make use of the image, good operability and convenience of the portable information terminal are secured, and since the opening/closing cover can thus be mounted at a position at which it will overlap with the display part when at the opened position, the opened opening/closing cover can be prevented from being extended from the outer edge part of the portable information terminal and enlarging the outer shape of the portable information terminal.

To achieve the above object, a portable information terminal according to a tenth aspect of the invention has, in addition to the arrangement according to the ninth aspect of this invention, the characteristic that when an opened/closed condition detection signal that indicates that the opening/closing cover has been opened is input from the opened/closed condition detection part, the above mentioned image display part applies to the image signals a signal process that compresses the image displayed on the display part. Thus even in the case where a part of the display part becomes hidden by the opened opening/closing cover and unable to be seen, the compressed image will be displayed at a portion of the display part that is not overlapped with the opening/closing cover at the opened position, thereby securing the operability and convenience of the portable information terminal.

To achieve the above object, a portable information terminal according to an eleventh aspect of the invention has, in addition to the arrangement according to the tenth aspect of this invention, the characteristic that the above mentioned signal process of compressing the image is a signal process that decreases the scanning lines for image display, and a compressed image is thereby displayed on the display part.

To achieve the above object, a portable information terminal according to a twelfth aspect of the invention has, in addition to the arrangement according to the tenth aspect of this invention, the characteristic that when an opened/closed condition detection signal that indicates that the opening/closing cover has been closed is input from the opened/closed condition detection part, the above mentioned image display part applies to the image signals a signal process that returns the compressed image displayed on the display part to the original size. The original image can thus be made to be displayed on the entirety of the display part when the opening/closing cover becomes closed and operation using the operating part is not performed.

To achieve the above object, a portable information terminal according to a thirteenth aspect of the invention has, in addition to the arrangement according to the tenth aspect of this invention, the characteristics that the above mentioned opening/closing cover is disposed at a position at which it will overlap with the above mentioned display part when at the opened position and the above mentioned image display part applies to the image signals a signal process that makes a compressed image be displayed on a portion of the display part that will not be overlapped with the opening/closing cover at the opened position. Since a compressed image will thus be displayed at a portion of the display part that is not overlapped with the opening/closing cover at the opened position, the operability and convenience of the portable information terminal will be secured, and since the opening/closing cover can be mounted at a position at which it will overlap with the display part at the opened position, the opened opening/closing cover can be prevented from being extended from the outer edge of the portable information terminal and enlarging the outer shape of the portable information terminal.

To achieve the above object, a portable information terminal according to a fourteenth aspect of the invention has, in addition to the arrangement according to the ninth aspect of this invention, the characteristic that when an opened/closed condition detection signal that indicates that the opening/closing cover has been opened is input from the opened/closed condition detection part, the above mentioned image display part applies to the image signals a signal process that scrolls the image displayed on the display part in a required direction. Thus even in the case where a part of the display part becomes hidden by the opened opening/closing cover and unable to be seen, the compressed image will be scrolled in a required direction so that the image of the necessary portion will be displayed at a portion of the display part that is not overlapped with the opening/closing cover at the opened position. The operability and convenience of the portable information terminal can thus be secured.

To achieve the above object, a portable information terminal according to a fifteenth aspect of the invention has, in addition to the arrangement according to the fourteenth aspect of this invention, the characteristic that when an opened/closed condition detection signal that indicates that the opening/closing cover has been closed is input from the opened/closed condition detection part, the above mentioned image display part applies to the image signals a signal process that scrolls the image, which is displayed on the display part and is at the scrolled position, back to the original position. The original image can thus be made to be displayed on the entirety of the display part when the opening/closing cover becomes closed and operation using the operating part is not performed.

To achieve the above object, a portable information terminal according to a sixteenth aspect of the invention has, in addition to the arrangement according to the fourteenth aspect of this invention, the characteristics that the above mentioned opening/closing cover is disposed at a position at which it will overlap with the above mentioned display part when at the opened position and the above mentioned image display part applies to the image signals a signal process that scrolls the image towards a portion of the display part that will not be overlapped with the opening/closing cover at the opened position. Since the scrolled part of the image that is necessary for operation, etc. will thus be displayed at a portion of the display part that is not overlapped with the opening/closing cover at the opened position, the operability and convenience of the portable information terminal will be secured, and since the opening/closing cover can be mounted at a position at which it will overlap with the display part at the opened position, the opened opening/closing cover can be prevented from being extended from the outer edge of the portable information terminal and enlarging the outer shape of the portable information terminal.

To achieve the above object, a portable information terminal according to a seventeenth aspect of the invention has, in addition to the arrangement according to the nineth aspect of this invention, the characteristic that when an opened/closed condition detection signal that indicates that the opening/closing cover has been opened is input from the opened/closed condition detection part, the above mentioned image display part applies to the image signals a signal process that moves an arbitrary image selected from the image displayed on the display part to a required position. Thus even in the case where a part of the display part becomes hidden by the opened the opening/closing cover and unable to be seen, the image of the necessary portion of the image displayed will be moved to a portion of the display part that is not overlapped with the opening/closing cover at the opened position. The operability and convenience of the portable information terminal can thus be secured.

To achieve the above object, a portable information terminal according to an eighteenth aspect of the invention has, in addition to the arrangement according to the seventeenth aspect of this invention, the characteristic that the above mentioned selection of the image to be moved is performed by the detection of the touched position of a touch panel mounted to the display part. A user can thus select the image portion to be moved and make this image portion be moved to the required position of the display part when the opening/closing cover is opened, simply by touching the portion of the touch panel, mounted to the display part, that corresponds to the position at which the desired image is displayed.

To achieve the above object, a portable information terminal according to a nineteenth aspect of the invention has, in addition to the arrangement according to the seventeenth aspect of this invention, the characteristic that when an opened/closed condition detection signal that indicates that the opening/closing cover has been closed is input from the opened/closed condition detection part, the above mentioned image display part applies to the image signals a signal process that moves the selected image, which is at the moved position in the display part, back to the original position. The moved image can thus be made to be displayed at the original position of the display part when the opening/closing cover becomes closed and operation using the operating part is not performed.

To achieve the above object, a portable information terminal according to a twentieth aspect of the invention has, in addition to the arrangement according to the seventeenth aspect of this invention, the characteristics that the above mentioned opening/closing cover is disposed at a position at which it will overlap with the above mentioned display part when at the opened position and the above mentioned image display part applies to the image signals a signal process that moves a selected image to a position of the display part that will not be overlapped with the opening/closing cover at the opened position. Since the image, which is the part of the image, displayed on the display part, that is necessary for operation, etc., will thus be displayed at a portion of the display part that is not overlapped with the opening/closing cover at the opened position, the operability and convenience of the portable information terminal will be secured, and since the opening/closing cover can be mounted at a position at which it will overlap with the display part at the opened position, the opened opening/closing cover can be prevented from being extended from the outer edge of the portable information terminal and enlarging the outer shape of the portable information terminal.

DETAILED DESCRIPTION OF THE PREFERRED EMBODIMENTS

Embodiments of this invention shall now be described in detail with reference to the drawings.

Figure 1:
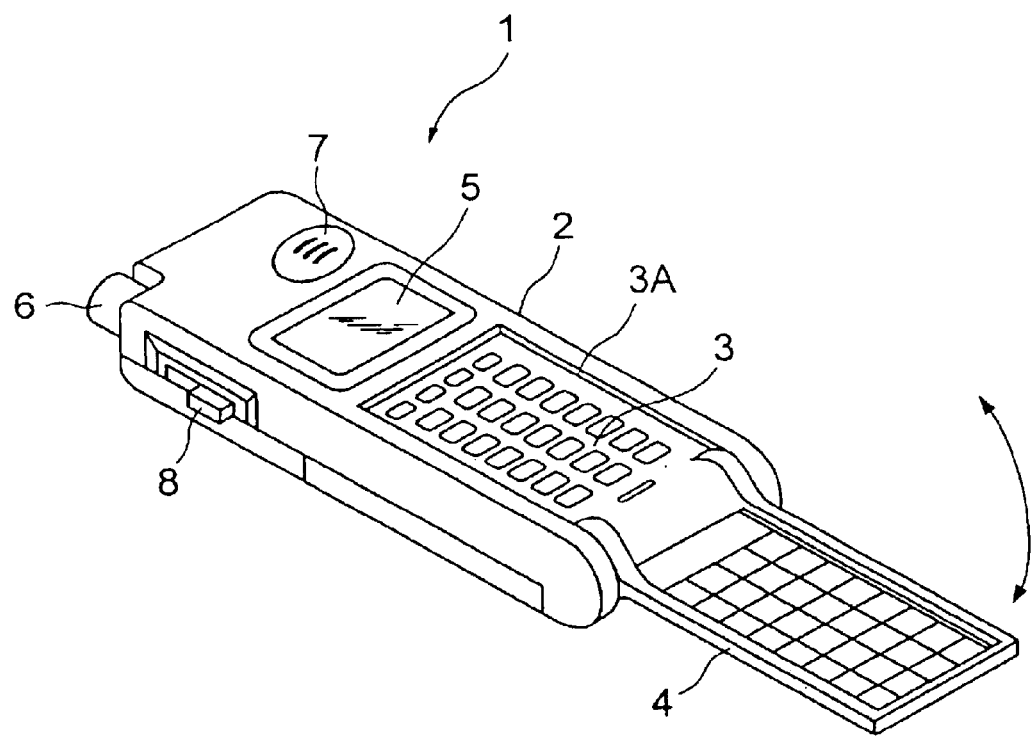
FIG. 1 is a perspective view, which shows an example of a prior-art portable telephone.
Figure 2:
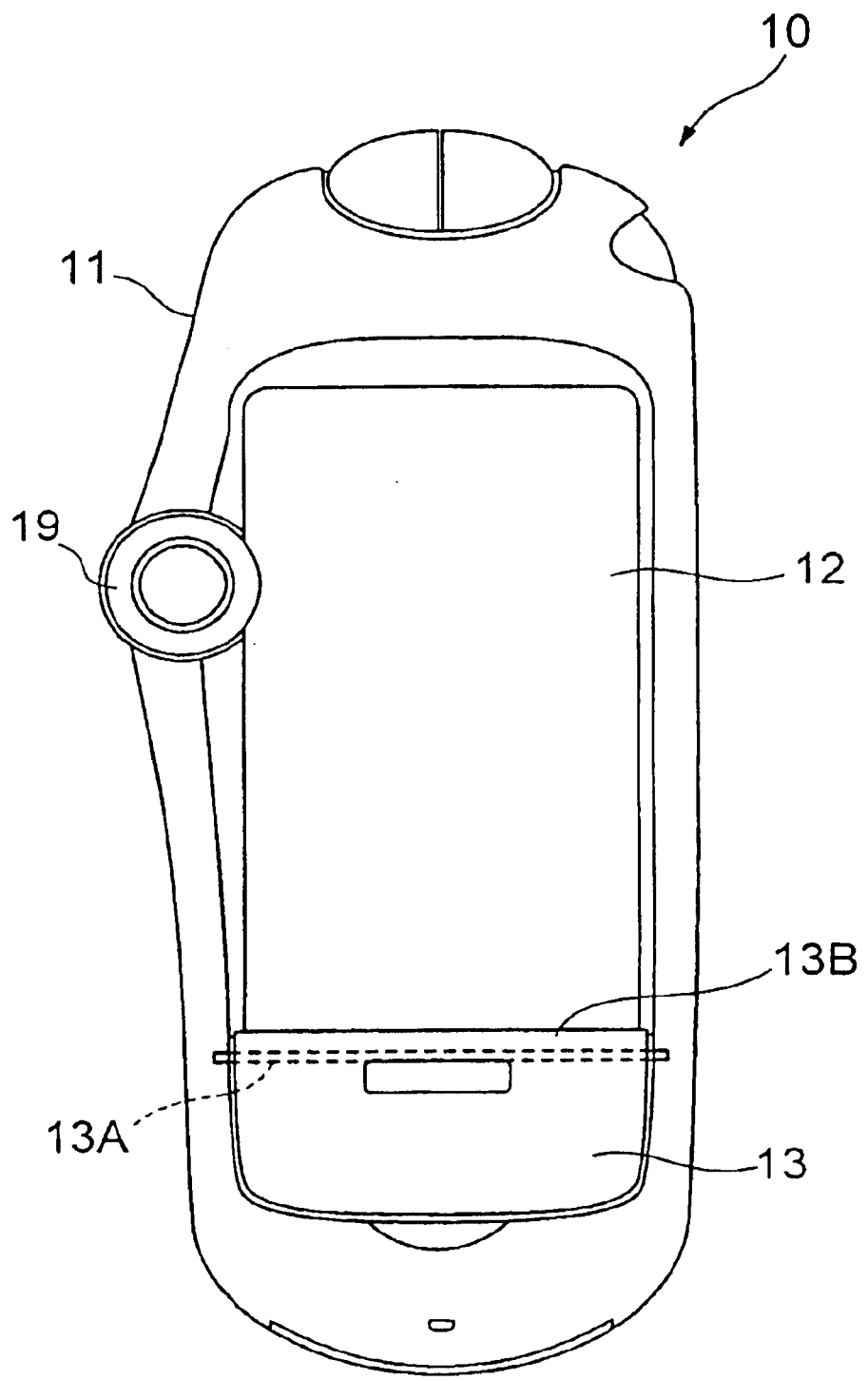
FIG. 2 is a front view, which shows the condition where the opening/closing cover of a first embodiment of a portable telephone by this invention has been closed.
Figure 3:
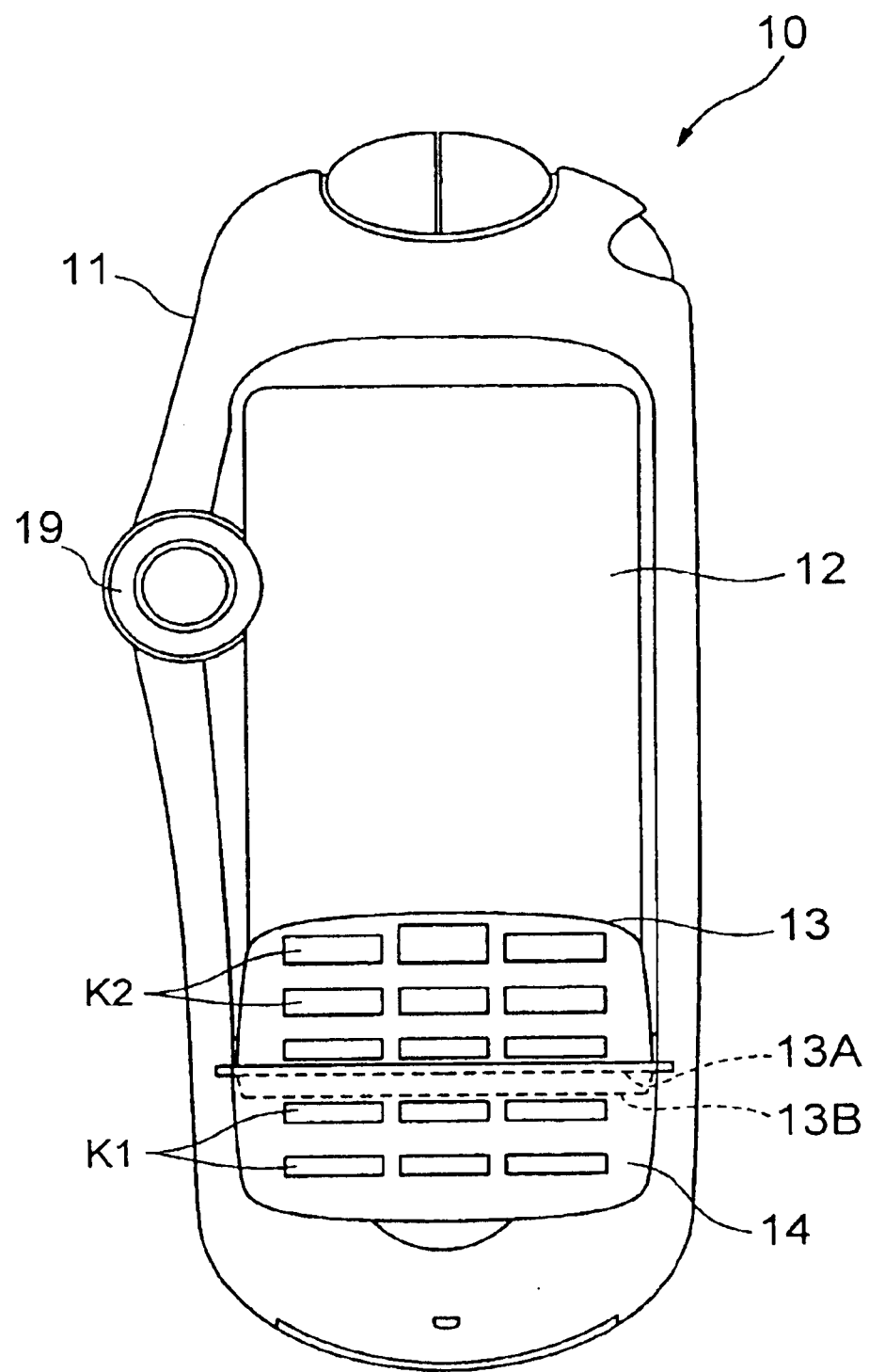
FIG. 3 is a front view, which shows the condition where the opening/closing cover of the same embodiment has been opened.

FIG. 2 is a front view, which shows a portable telephone equipped with cover opening/closing mechanism by this invention in the standby condition, and FIG. 3 is a front view, which shows this portable telephone in the operated condition.

In FIGS. 2 and 3, a portable telephone 10 has a display panel 12 disposed at the central part of the surface of a main casing 11, and an opening/closing cover 13 is mounted to the lower part of this display panel 12.

Figure 4:
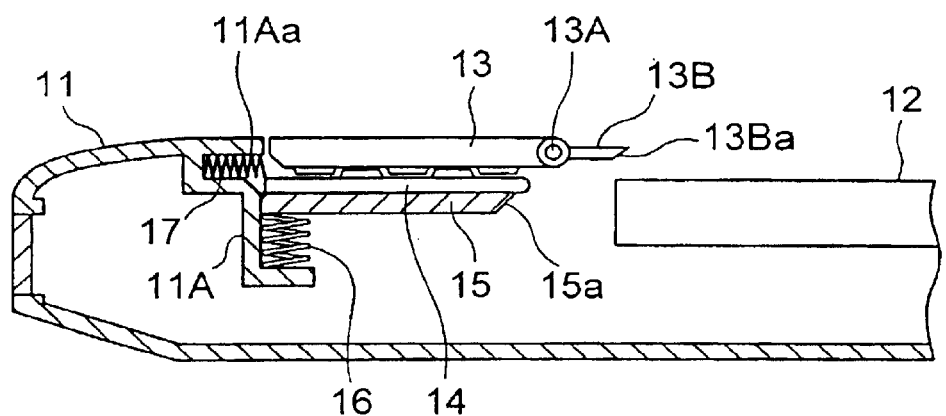
FIG. 4 is a sectional side view, which shows the condition where the opening/closing cover of the same embodiment has been closed.

As shown in FIG. 4, the opening/closing cover 13 has its upper end part (the right end part in FIG. 4) mounted by a parallel shaft 13A to the bottom edge (the left edge in FIG. 4) of the display panel 12 in a manner enabling rotation in the vertical direction (left/right direction in FIG. 4) with respect to the main casing 11.

Furthermore as shown in FIG. 4, the position of the opening/closing cover 13 is set so that when the opening/closing cover 13 is at the closed position with respect to the main casing 11, the surface will be substantially flush with the surface of the main casing 11, and the position of the display panel 12 is set so that it will be positioned to the inner side of the main casing 11 substantially by just the thickness of the opening/closing cover 13.

As shown in FIGS. 2 and 4, the opening/closing cover 13 has an integrally formed arm part 13B, which, in the condition where the opening/closing cover 13 is at the closed position with respect to the main casing 11, extends from the position of shaft 13A to the side of the display panel 12.

The upper edge (the right edge in FIG. 4) of this arm part 13B is positioned just at the same position as the lower edge (the left edge in FIG. 4) of the display panel 12 so that when the portable telephone 10 is viewed from the front, a gap cannot be seen between the display panel 12 and the arm part 13B.

An inclined surface 13Ba, which is inclined downwards (leftwards in FIG. 3) from the front face to the back face is formed on the front end part of the arm part 13B.

An operating panel 14 is fitted in a manner enabling rising and lowering onto the portion of the main casing 11 that is covered by the opening/closing cover 13, and at the back face side of this operating panel 14, an ascending/descending support plate 15 is joined to the operating panel 14 in a manner that does not allow separation but enables sliding in the vertical direction (left/right direction in FIG. 4) by the fitting of unillustrated fitting grooves formed on the mutual joining surfaces.

First operating buttons K1, such as telephone number input keys, function keys, etc., are disposed on the front face of the operating panel 14 and second operating buttons K2 are disposed on the back face side of the opening/closing cover 13.

A compression spring 16 is interposed between the back face of the ascending/descending support plate 15 and a frame part 11A, which is formed in an integral manner on the inner side of the main casing 11, and this compression spring 16 urges the ascending/descending support plate 15 and the operating panel 14 towards the front face side of the main casing 11.

An inclined surface 15a, which is inclined downwards (leftwards in FIG. 4) from the front face to the back face, is formed on the upper end part of the ascending/descending support plate 15.

As shall be described in more detail below, a recessed part 11Aa, into which the ascending/descending support plate 15 in the raised position fits upon sliding in the downward direction (leftward direction in FIG. 4) of the main casing 11, is formed on frame part 11A of main casing 11.

Inside this recessed part 11Aa is mounted a spring 17, which is compressed by the entering ascending/descending support plate 15, and an unillustrated opened/closed condition detection switch, which, by being pressed and turned on by the further entry of the ascending/descending support plate 15, conducts power to the first operating buttons K1 disposed on the operating panel 14 and the second operating buttons K2 disposed on the opening/closing cover 13 to enable their operation.

In FIGS. 2 and 3, 19 denotes an operating dial for performing the operation of switching the display screen, etc. of the display panel 12.

With the above-described portable telephone 10, when operation is not performed as in the condition of standby for receiving calls, the opening/closing cover 13 is closed so as to cover the operating panel 14 as shown in FIG. 2 and is latched to the main casing 11 by the engagement of an unillustrated engaging part.

When communication by the portable telephone 10 is to be performed or when the various functions equipped in the portable telephone 10 are to be used, the opening/closing cover 13 is opened by rotating it about the shaft 13A in the upward direction with respect to the main casing 11 so that the operating panel 14 will be exposed as shown in FIG. 3.

The action of the operating panel 14 in the process of this opening operation of the opening/closing cover 13 is as follows.

That is, in the condition where the opening/closing cover 13 is closed as shown in FIG. 4, the operating panel 14 and the ascending/descending support plate 15 are pushed towards and housed at the inner side of the main casing 11 against the urging force of the compression spring 16.

Figure 5:
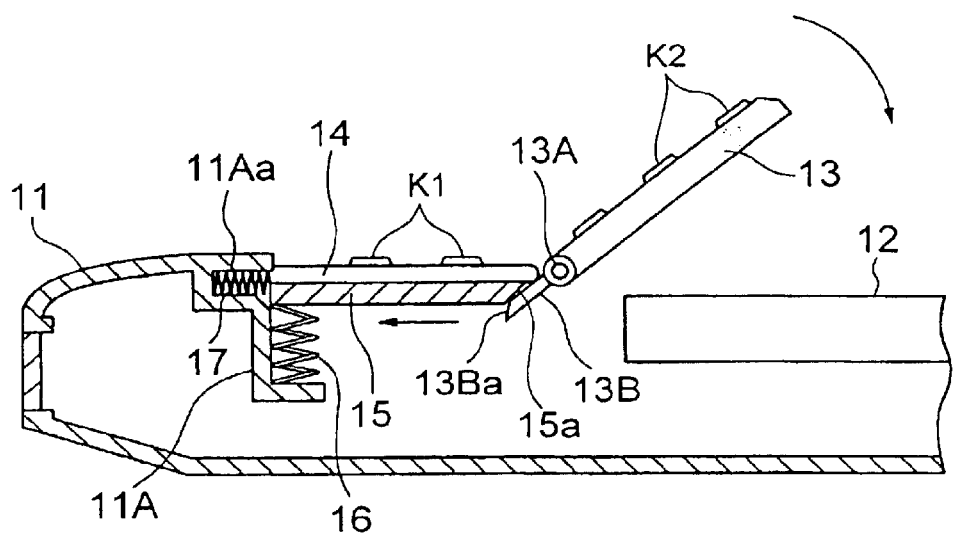
FIG. 5 is a sectional side view, which shows an intermediate condition during the opening of the opening/closing cover of the same embodiment.

Then when the opening/closing cover 13 is rotated in the opening direction as shown in FIG. 5 and the pressing force, which presses the operating panel 14 and the ascending/descending support plate 15 towards the inner side of the main casing 11 against the urging force of the compression spring 16, is relieved, the operating panel 14 and the ascending/descending support plate 15 are raised in the outward direction (rising direction in FIG. 5) of the main casing 11 by the compression spring 16.

In this process, the arm part 13B, which rotates and enters inside the main casing 11 in accompaniment with the upward (rightward in FIG. 5) rotation of the opening/closing cover 13 about the shaft 13A, comes in contact with the upper end parts (right end parts in FIG. 5) of the operating panel 14 and the ascending/descending support plate 15 from below.

The arm part 13B then supportingly raises the upper end parts of the operating panel 14 and the ascending/descending support plate 15 in accompaniment with this rotation of the opening/closing cover 13, and the ascending/descending support plate 15 becomes urged in the downward direction (leftward direction in FIG. 5) of the main casing 11 by the sliding of the inclined surface 13Ba of the arm part 13B against the inclined surface 15a of the ascending/descending support plate 15.

Thus as the ascending/descending support plate 15 is raised in the outward direction of the main casing 11, the ascending/descending support plate 15 slides against the operating panel 14 and slides in the downward direction of the main casing 11.

Figure 6:
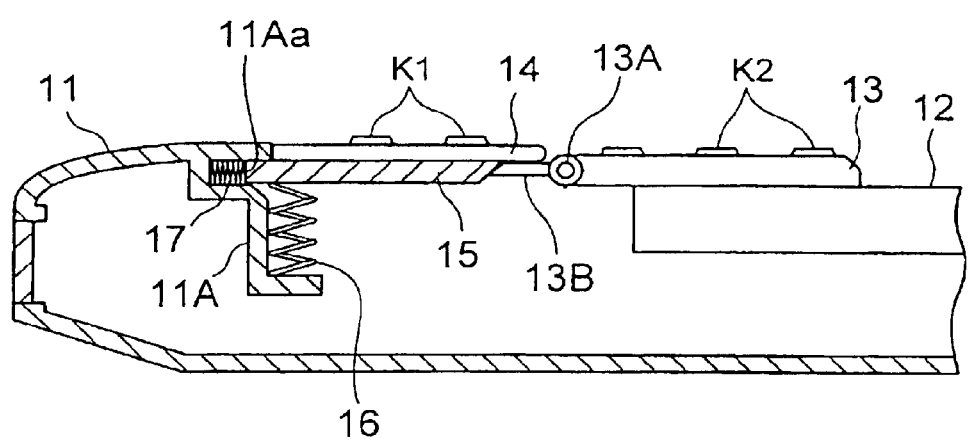
FIG. 6 is sectional side view, which shows the condition where the opening/closing cover of the same embodiment is positioned at the opened position.

Then when the opening/closing cover 13 becomes completely opened as shown in FIG. 6, the opening/closing cover 13 becomes positioned at a position on the display panel 12 where the back face (operating surface) on which the second operating buttons K2 are disposed will be substantially flush with the front face of the main casing 11.

In this process, the lower end part (left end part in FIG. 6) of the ascending/descending support plate 15 becomes fitted into the recessed part 11Aa, formed on frame part 11A of the main casing 11, while compressing the spring 17, and the ascending/descending support plate 15 and the operating panel 14, which is joined to the ascending/descending support plate 15 in an inseparable manner, become latched to the main casing 11 and thereby prevented from rising further.

In this condition, the operating panel 14 is positioned at a position at which the front side operating surface on which the first operating buttons K1 are disposed will be substantially flush with the front face of the main casing 11.

Thus when the opening/closing cover 13 is opened, the operating panel 14 is raised and the operating surface, on which the first operating buttons K1 are disposed, and the operating surface (back face) of the opening/closing cover 13, on which the second operating buttons K2 are disposed, become aligned in substantially the same plane.

Also at this time, the unillustrated opened/closed condition detection switch, mounted inside recessed part 11Aa, comes in contact with the end part of the ascending/descending support plate 15 that has been fitted inside this recessed part 11Aa and is thereby turned on to conduct power and thus enable operation by first operating buttons K1 and second operating buttons K2.

In the process of closing the opening/closing cover 13 in reverse to the above-described process, when the opening/closing cover 13 is raised from the display panel 12 and is rotated downwards with respect to the main casing 11, the arm part 13B, which supported the lower part of the operating panel 14 and urged the ascending/descending support plate 15 in the direction of pushing it into the recessed part 11Aa by means of the inclined surface 13Ba, becomes separated from the operating panel 14 and the ascending/descending support plate 15 and the spring 17, which was compressed, urges the lower end part of the ascending/descending support plate 15 and slides it in the direction of pushing it out from inside recessed part 11Aa.

The engagement of the ascending/descending support plate 15 and recessed part 11Aa is thereby disengaged, and thereafter, the opening/closing cover 13, which is being rotated downwards, presses the operating panel 14 towards the inner side of the main casing 11 against the urging force of the compression spring 16, and the operating panel 14 and the ascending/descending support plate 15 are thereby pushed into the main casing 11.

The opening/closing cover 13 then becomes latched to the main casing 11 by means of an unillustrated engaging part and, as shown in FIG. 2, the operating surface of the operating panel 14 becomes completely housed at the inner side of the opening/closing cover 13 so as to become unable to be seen from the outer side.

At this time, the engagement of the opened/closed condition detection switch, mounted to the interior of recessed part 11Aa, and the ascending/descending support plate 15 becomes disengaged and the power to first operating buttons K1 and second operating buttons K2 is thereby turned off and the operation of these buttons is disabled.

Though the raising and lowering of the operating panel 14 is carried out by a mechanical arrangement in the above-described example, this process may also be carried out electrically by a method, such as incorporating a small motor inside the main casing 11.

Figure 7:
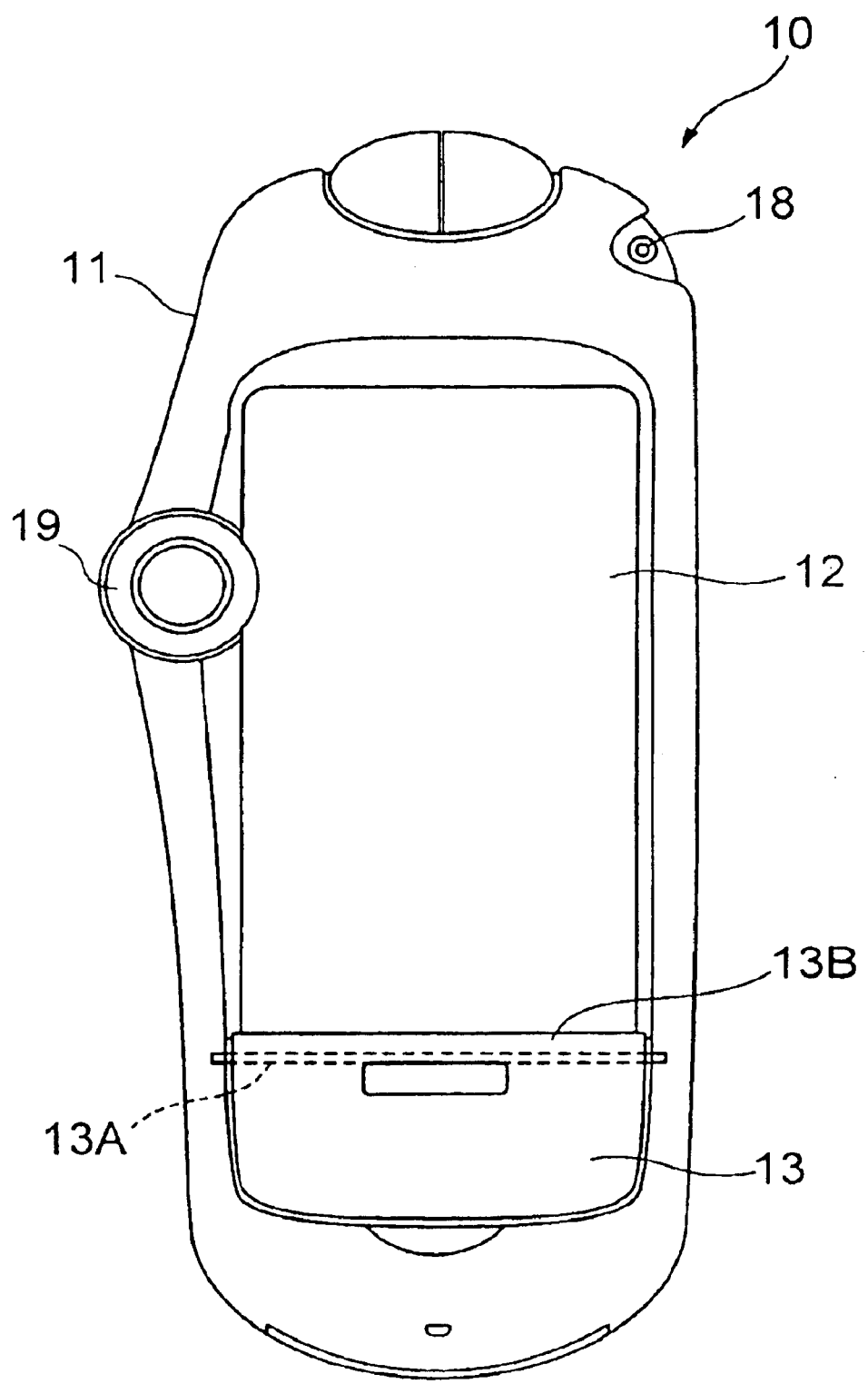
FIG. 7 is a front view, which shows the condition where the opening/closing cover of another embodiment of a portable telephone by this invention has been closed.
Figure 8:
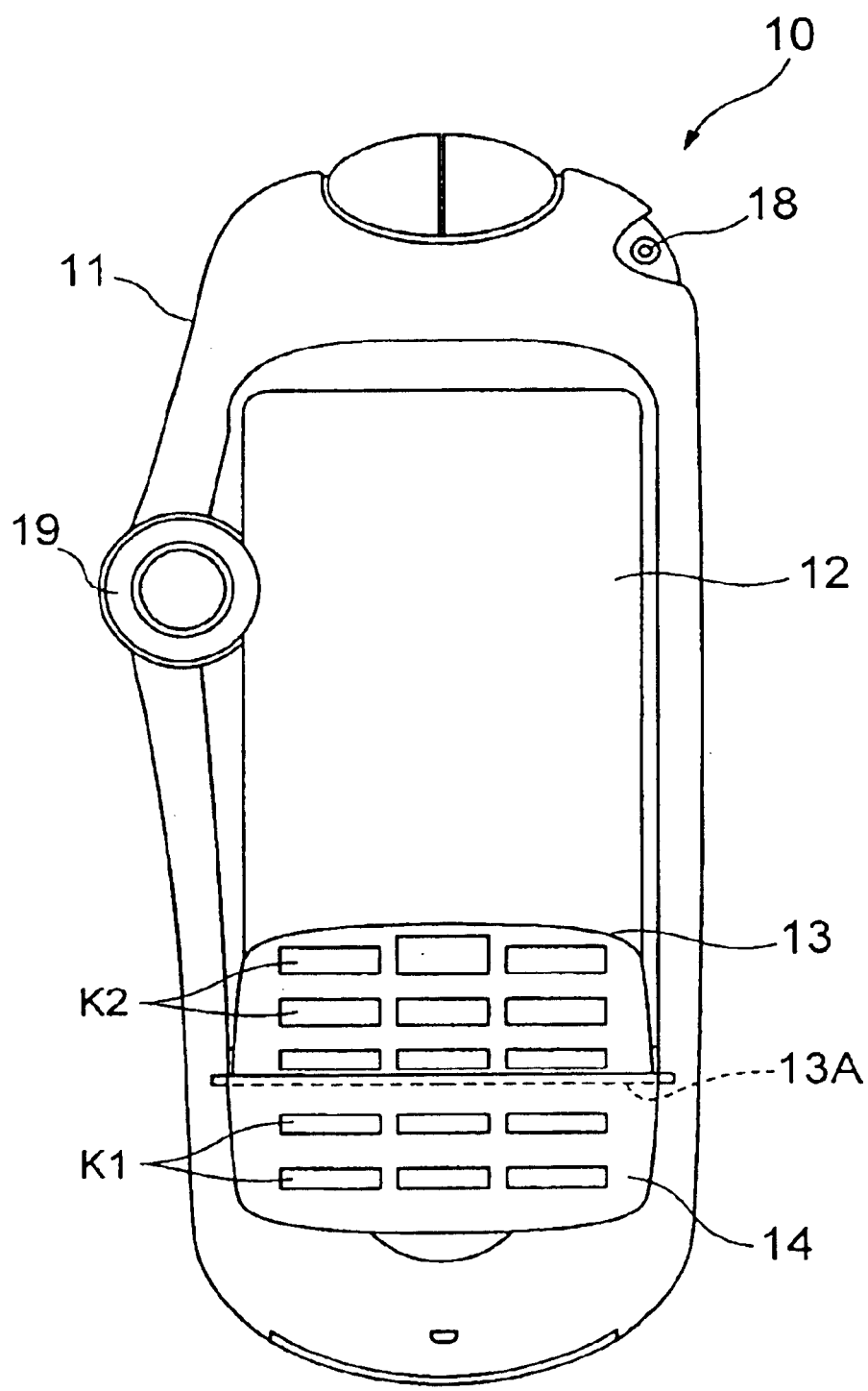
FIG. 8 is a front view, which shows the condition where the opening/closing cover of the same embodiment has been opened.

FIG. 7 is a front view, which shows another embodiment of a portable telephone by this invention in the standby condition and FIG. 8 is a front view, which shows this portable telephone in the operating condition.

In FIGS. 7 and 8, the portable telephone 10 has the display panel 12 disposed at the central part of the surface of the main casing 11, and an the opening/closing cover 13 is mounted to the lower part of this display panel 12.

The upper end part of this opening/closing cover 13 is mounted in a manner enabling rotation in the vertical direction with respect to the main casing 11 by a shaft 13A, which is parallel to the lower edge of the display panel 12.

The operating panel 14 is mounted at a portion of the main casing 11 that is covered by the opening/closing cover 13, and as shown in FIG. 8, first operating keys K1, such as telephone number input keys, function keys, etc., are disposed on the front face of this operating panel 14 and second operating keys K2 are disposed on the back face (the surface that becomes the front side in the opened condition) of the opening/closing cover 13.

In FIGS. 7 and 8, 18 denotes a CCD camera and 19 denotes a jog dial for performing operations, such as the switching of the display screen of the display panel 12, etc.

With the above-described portable telephone 10, even when the opening/closing cover 13 is opened and the operating surface of the operating panel 14 becomes exposed as shown in FIG. 8 from the condition where the opening/closing cover 13 is closed as shown in FIG. 7, the outer shape of the portable telephone 10 will not become enlarged since the opening/closing cover 13 is opened in the upward direction and unfolded over the display panel 12 and is therefore not extended outside the peripheral parts of the main casing 11.

Figure 9:
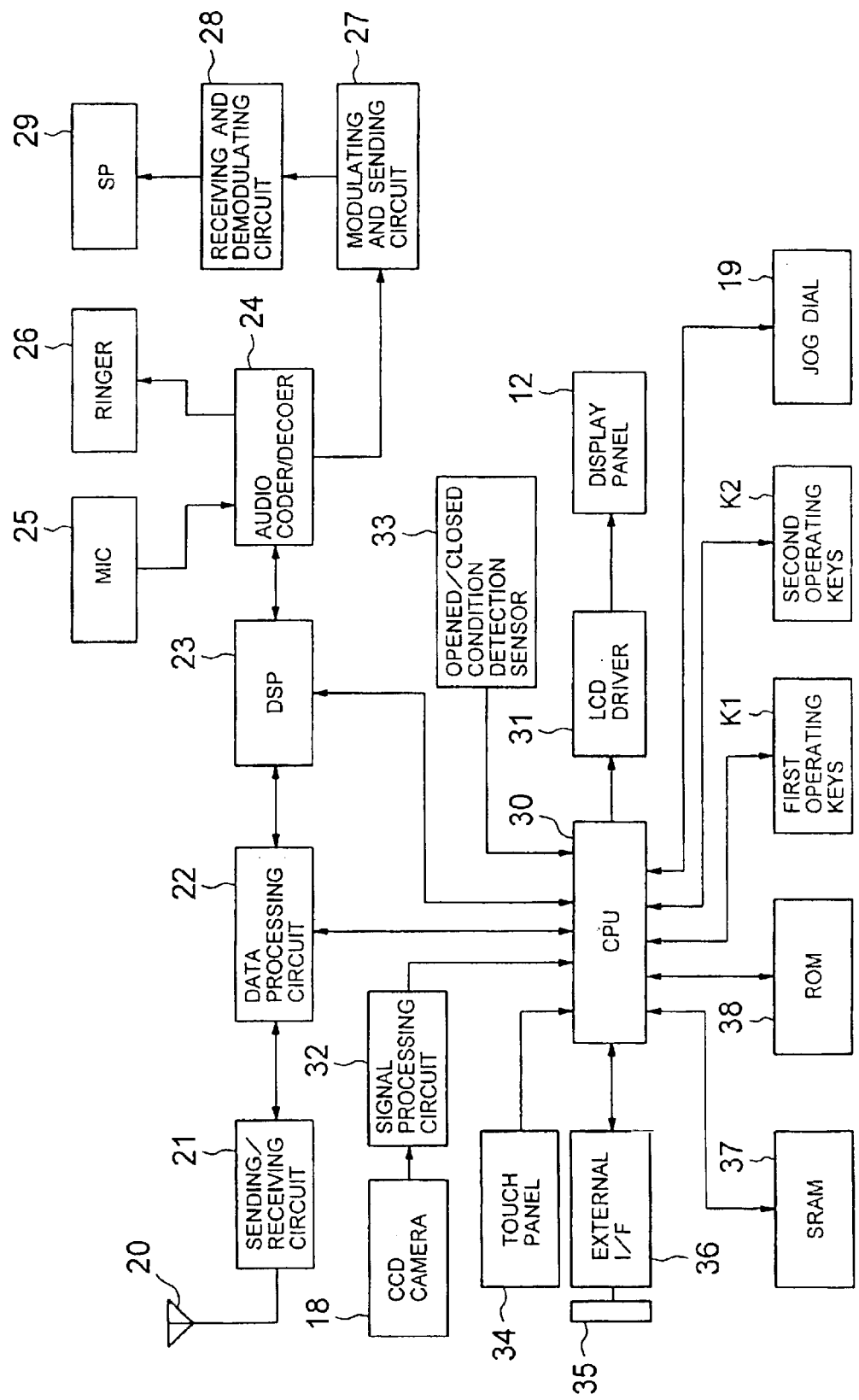
FIG. 9 is a block diagram, which shows the control part of the same embodiment.

FIG. 9 is a block diagram, which shows an example of the arrangement of the control unit of this portable telephone 10. As shown in FIG. 9, a sending/receiving circuit 21, a data processing circuit 22, which performs clock control of the image signals and audio signals received by the sending/receiving circuit 21 and functions as an interface with a below-described CPU, and a DSP (Digital Signal Processor) 23, which is a high-speed arithmetic processing type microprocessor, are connected successively to an antenna 20 mounted to the main casing 11 of the portable telephone 10.

An audio coder/decoder 24 is connected to the DSP 23, a microphone 25 and a ringer 26 are connected to the audio coder/decoder 24, and furthermore, a speaker 29 is connected to the coder/decoder 24 via a modulating sending circuit 27 and a receiving demodulating circuit 28.

A CPU 30 is connected to the data processing circuit 22 and the DSP 23.

To this CPU 30, the display panel 12 is connected via an LCD driver 31, a CCD camera 18 is connected via a signal processing circuit 32, an opened/closed condition detection sensor 33, which is mounted to the opening/closing part of the opening/closing cover 13 and detects the opened/closed condition of the opening/closing cover 13, and a touch panel 34, mounted to the display panel 12, are connected, and a connector 35, which is connected to a personal computer, etc. for performing transaction of various data with the personal computer etc., is connected via an external I/F 36. Also connected to the CPU 30 are an SRAM 37, in which are stored various personal data, such as the shortcut dial numbers, etc. input by a user, a ROM 38, in which the various control programs of the portable telephone are stored, first operation keys K1 and second operation keys K2, which include various operating keys, such as the function keys and numerical keys for input of telephone numbers, and the jog dial 19.

With this control unit of the portable telephone 10, a radio wave that is received by the sending/receiving circuit 21 via the antenna 20 is separated into image signals and audio signals at the subsequent data processing circuit 22, and while being subject to the respective clock control based on instructions from the CPU 30, the image signals are output to the CPU 30 and the audio signals are output to the DSP 23.

The audio signals that are input into the DSP 23 undergo audio processing at the DSP 23, are then input into and D/A converted by the audio coder/decoder 24, and output via the modulating sending circuit 27 and the receiving demodulating circuit 28 to the speaker 29 or the ringer 26.

Audio signals input from the microphone 25 are A/D converted by the audio coder/decoder 24 and are then transmitted from the antenna 20 via the DSP 23, the data processing circuit 22, and the sending/receiving circuit 21.

The CPU 30 supervises the control of the operations of the data processing circuit 22, DSP 23, LCD driver 31, etc. by means of the various portable telephone control programs that are stored in the ROM 38.

That is, based on an operation signal from an operating key among the first operating keys K1 and the second operating keys K2, the CPU 30 reads out, from the ROM 38, the control program corresponding to the operation signal, and based on the control program that has been read out, outputs image data for the operating screen onto the LCD driver 31 to make the operating screen be displayed on the display panel 12 and performs operation control of the data processing circuit 22 and the DSP 23 and the writing of data into or reading of data from the SRAM 37 or transaction, etc. of data with a personal computer, etc. which is connected by the connector 35.

Furthermore, when a display screen switching operation by the jog dial 19 is performed, the CPU 30 outputs the corresponding image data read out from the ROM 38 to the LCD driver 31 and performs switching of the screen displayed on the display panel 12.

Furthermore, when photography by a CCD camera 18 is performed, video signals from the CCD camera 18, which have been signal processed by the signal processing circuit 32, are input into the CPU 30, and the CPU 30 then outputs these video signals to the LCD driver 31 to make the captured image be displayed on the display panel 12.

Here, as has been mentioned above, since with the portable telephone 10, the opening/closing cover 13 is arranged to open upwards and become unfolded over the display panel 12, the lower portion of the display panel 12 becomes hidden by the opening/closing cover 13 in the opened condition. There is thus a problem that a part of the screen displayed on the display panel 12 cannot be viewed as it is.

The portable telephone 10 thus has a below-described screen processing program equipped in the abovementioned ROM 38 of the control unit, and when the opening of the opening/closing cover 13 is detected by the opened/closed condition detection sensor 33, the CPU 30 performs such processes as those described below based on the screen processing program read out from the ROM 38 so that the entirety or the necessary part of the screen displayed on the display panel 12 can be viewed.

Figure 10A:
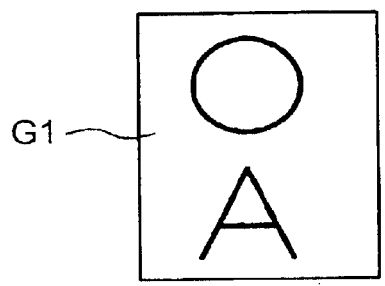
FIGS. 10A and 10B are explanatory diagrams, which show an example of the image process of the same embodiment.
Figure 10B:
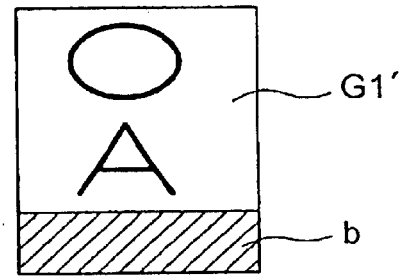

That is, when the opened/closed condition detection sensor 33 detects that the opening/closing cover 13 has been opened, the CPU 30, based on the detection signal input from the opened/closed condition detection sensor 33, performs signal processing of the image signal output to the LCD driver 31 so that the image displayed on the display panel 12 will have the form of the image G1', which is shown in FIG. 10B and is compressed in the upper direction in comparison to the image G1, shown in FIG. 10A that is displayed when the opening/closing cover 13 is closed.

The part of the screen that becomes hidden when the opening/closing cover 13 is opened thus becomes a blank b and the hiding of the image displayed on the display panel 12 by the opening/closing cover 3 is avoided.

This compression of the image is performed for example by decreasing (thinning) the number of scan lines of image G1 in correspondence to the number of pixels in the vertical direction of the display space of the display panel 12 in which the compressed image is to be displayed.

When the opened/closed condition detection sensor 33 detects that the opening/closing cover 13 has been closed, the CPU 30, based on the detection signal input from the opened/closed condition detection sensor 33, recovers the original image G1, shown in FIG. 10A, from the compressed image G1' of FIG. 10B, which had been displayed on the display panel 12.

Figure 11A:
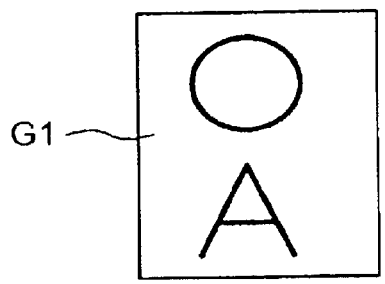
FIGS. 11A and 11B are explanatory diagrams, which show another example of the image process of the same embodiment.
Figure 11B:
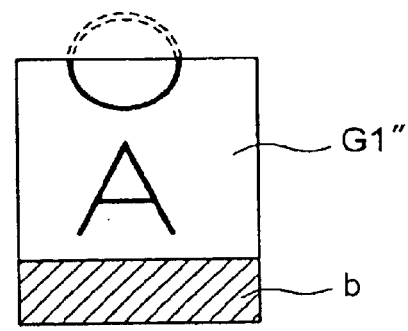

If for example in the process of operating a first operating key K1 or second operating key K2, only the image of A, which is displayed at the lower part of the screen, is required among the parts of the image G1 of FIG. 11A, displayed on the display panel 12, the CPU 30, upon input of a detection signal indicating the detection of the opening of the opening/closing cover 13 from the opened/closed condition detection sensor 33, scrolls the image G1 in the upward direction so that the partial image G1" within the image G1, which contains the image of A, will be displayed on the display panel 12 as shown in FIG. 11B.

When the opened/closed condition detection sensor 33 detects that the opening/closing cover 13 has been closed, the CPU 30, based on the detection signal input from the opened/closed condition detection sensor 33, returns the image G1" of FIG. 11B, which was displayed at the scrolled position on the display panel 12, to the original position of image G1 of FIG. 11A.

Figure 12A:
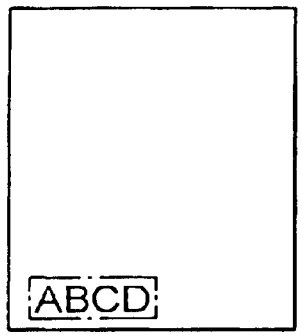
FIGS. 12A and 12B are explanatory diagrams, which show yet another example of the image process of the same embodiment.

Also, if in the process of operating a first operating key K1 or second operating key K2, a desired text or image displayed on the display panel 12 is to be kept visible, that is for example, if an image captured by the CCD camera 18 or a photograph or text, etc. (the characters "ABCD" in the example illustrated in FIG. 12) that was sent from another terminal device is displayed on the part of the display panel 12 that will become hidden when the opening/closing cover 13 is opened as shown in FIG. 12A and this photograph or text, etc. is to be made visible even when the opening/closing cover 13 has been opened, the user of the portable telephone 10 touches the photograph or text, etc. (in this case, the characters "ABCD"), which is to be made visible even when the opening/closing cover 13 is opened, before opening the opening/closing cover 13.

By this selection operation, the touched position on the display panel 12, that is, the position at which the desired photograph or text is displayed is detected by the touch panel 34 (see FIG. 9) mounted to the display panel 12, and based on the touched position detection signal input from this touch panel 34, the CPU 30, upon input of the detection signal indicating the detection of the opening of opening/closing cover 13 by the opened/closed condition detection sensor 33, moves the photograph or text, etc. (in this case, the characters "ABCD") at the position indicated by the touched position detection signal to a part of the display panel 12 that will not be hidden by the opening/closing cover 13 when the opening/closing cover 13 is opened as shown in FIG. 12B.

Figure 12B:
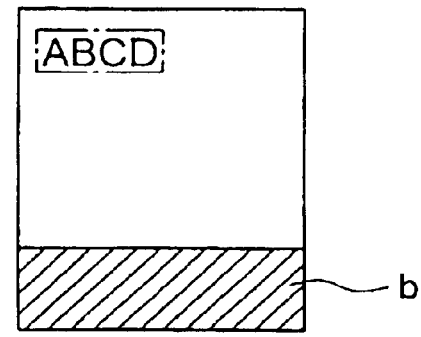

When the opened/closed condition detection sensor 33 detects that the opening/closing cover 13 has been closed, the CPU 30, based on the detection signal input from the opened/closed condition detection sensor 33, moves the text of FIG. 12B, which is displayed on the display panel 12 at the moved position, back to the original position of FIG. 12A.

This application is based on Japanese Patent Applications Nos. 2000-176617 and 2000-169132 which are hereby incorporated by reference.

What is claimed is:

1. A portable telephone, equipped with an opening/closing cover, which can be opened and closed and houses an operating part at the inner side, said portable telephone being equipped with an operating panel, which comprises said operating part and is mounted to a main casing of the portable telephone in a manner enabling movement between a position at the front face side and a position at the inner side of the main casing, and a moving part, which moves said operating panel between the position at the front face side and the position at the inner side of the main casing, wherein when said opening/closing cover is at the closed position, said operating panel is positioned at the position at the inner side of the main casing and is housed at the inner side of the opening/closing cover, and when the opening/closing cover is opened, the operating panel is moved to the position at the front face side of the main casing by the moving part in accordance with the opening operation of the opening/closing cover so that the operating surface of the operating panel will be positioned at a position at which it will be substantially flush with the back face of the opening/closing cover that is positioned at the opened position, wherein said moving part comprises a resilient member that is interposed between the operating panel and the main casing and urges the operating panel toward the position at the front face side of the main casing.

2. A portable telephone as set forth in claim 1, wherein a part of the operating part is disposed at the back face side of said opening/closing cover.

3. A portable telephone as set forth in claim 1, wherein said moving part further comprises an arm member, which is provided on the opening/closing cover and, in accompaniment with the opening operation of the opening/closing cover, engages with said operating panel to urge the operating panel toward the position at the front face side of the main casing.

4. A portable telephone as set forth in claim 1, further comprising a movable member, which is mounted to said operating panel in a manner enabling movement relative to the operating panel and which, by the urging force that accompanies the opening operation of the opening/closing cover, is moved in the direction of engaging with the main casing and becomes latched to the main casing to position the operating panel at the position at the front face side of the main casing.

5. A portable telephone as set forth in claim 4, further comprising a disengaging part, which, when the urging force on said movable member is relieved, urges the engaged movable member in the direction of disengaging from the main casing, wherein said disengaging part is provided at the part of the main casing with which said movable member engages.

6. A portable telephone as set forth in claim 1, wherein said main casing is equipped with an opened/closed condition detection part, which detects that the opening/closing cover is opened and thereupon sets said operating part in the condition that enables a user's operation.

7. A portable telephone as set forth in claim 1, wherein said opening/closing cover is mounted to the main casing at a position such that the opening direction will be at the display panel side of the portable telephone.

* * * * *